(12) United States Patent
Snow et al.

(10) Patent No.: US 6,418,221 B1
(45) Date of Patent: *Jul. 9, 2002

(54) SIGNAL COUPLER USING LOW VOLTAGE FILTERING

(75) Inventors: Dane Roderick Snow, Santa Clara; Mark Rosen, Auburn, both of CA (US)

(73) Assignee: Broadcom, Corp, Irvine, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,953

(22) Filed: Apr. 9, 1998

(51) Int. Cl.[7] .......................... H04M 1/00; H04M 11/00

(52) U.S. Cl. ...................... 379/399.01; 379/93.05; 379/412

(58) Field of Search .................. 379/399, 93.05, 379/93.07, 93.28, 93.09, 411, 412, 124; 370/494; 333/17.1; 375/220, 222

(56) References Cited

U.S. PATENT DOCUMENTS

| 4,768,188 A | * | 8/1988 | Barnhart et al. ............... 370/80 |
| 4,903,295 A | | 2/1990 | Shannon et al. ............. 379/437 |
| 4,991,051 A | * | 2/1991 | Hung .......................... 379/399 |
| 5,452,345 A | * | 9/1995 | Zhou et al. .................. 379/124 |
| 5,627,501 A | * | 5/1997 | Biran et al. ................. 333/17.7 |
| 5,757,803 A | * | 5/1998 | Russell et al. .............. 370/494 |
| 5,841,841 A | * | 11/1998 | Dodds et al. ............. 379/93.08 |
| 6,067,316 A | * | 5/2000 | Amrany et al. ............. 375/220 |

FOREIGN PATENT DOCUMENTS

| EP | 0105184 A | * | 11/1984 |
| EP | 0 677 938 A1 | | 10/1995 |
| FR | 2 719 721 A1 | | 5/1994 |

OTHER PUBLICATIONS

Schaumann, Rolf, "Continuous–Time Integrated Filters—A Tuturial", Department of Electrical Engineering, Portland State University, Reprinted from IEE Proceedings, vol. 136, Pt. G. pp. 184–190, pp. 3–14, Aug. 1989.*

Teccor Electronics, Inc., "SIDACtor Solid State Over Voltage Protection Product Catalog", pp. 1–22, Dec. 1997.*

Teccor Electronics, Inc., "SIDACtor® State Over Voltage Protection Product Catalog", pp. 1–22.

Johme, David A. and Martin, Ken, "Continuous–Time Filters", *Analog Integrated Devices*, (John Wiley & sons, 1997).

Cook, J. and Sheppard, P., "ADSL and VADSL Splitter Design and Telephony Performance", *IEEE Journal on Selected Areas in Communications*, vol. 13, No. 9, Dec. 1995, pp. 1634–1642.

Cirrus Logic, "DAA and Telephony Interface Design Notes", Data Book v1.1, CL–MD34XX, Feb. 1997, pp. 107–109.

Lucent Technologies, "Overvoltage Protection of Solid–State Subscriber Loop Circuits", Application Note, Feb. 1997, pp. 1–23.

(List continued on next page.)

Primary Examiner—Binh Tieu
Assistant Examiner—George Eng
(74) Attorney, Agent, or Firm—Timothy W. Markison

(57) ABSTRACT

A signal coupler is provided which decreases the number of discreet elements required to provide low pass filtering for the plain old telephone service (POTS). The low pass filtering is shifted to areas of the signal coupler circuit which do not operate with the high battery voltage present on telephone lines The low voltage filtering reduces the need for components which are capable of operating in the high voltage environment and therefore reduces the space on the circuit board which is occupied by each of the signal couplers. In this way, the number of individual subscriber lines that a given circuit board can accommodate can be increased.

11 Claims, 5 Drawing Sheets

OTHER PUBLICATIONS

"Electromagnetic Compatibility and Electrical Safety Lightning and AC Power Fault", GR–1089–CORE, Dec. 1996, pp. 4–10–4–15, B–1.

Lucent Technologies, "T7531A/T7536 16–Channel Programmabler Codec Chip Set", Preliminary Data Sheet, Dec. 1996, pp. 1–45.

Lucent Technologies, "L7585 Full–Feature, Low–Power SLIC and Switch", Preliminary Data Sheet, Jan. 1997, pp. 1–19.

National Semiconductor, "High Voltage Protection Techniques with TP3210 Subscriber Line Interface Module", Application Note 639, Duncan Bremner, Telecom Products, Jan. 1990, pp. 1–9.

Schaumann, Rolf, "Continuous–Time Filters—A Tutorial", Department of Electrical Engineering, Portland State University, Reprinted from IEE Proceedings, vol. 136, Pt. G. pp. 184–190, Aug. 1989, pp. 3–14.

* cited by examiner signal coupler using low voltage filtering

SIGNAL COUPLER USING LOW VOLTAGE FILTERING

BACKGROUND

1. Field of the Invention

The invention relates to a signal coupler for telephone lines containing both plain old telephone service (POTS) and digital signals where low voltage filtering is used in the POTS channel.

2. Description of the Related Art

Modern data networks commonly use complex digital signal processing (DSP) devices called modems to transport data over communication channels. Data is typically transported via an analog transmission signal which is representative of a synchronous, constant rate bit stream. This form of communication channel is suitable for the transmission of real-time information such as voice or video.

Often it is desirable to transmit both Plain Old Telephone Service (POTS) and digital data, either by Asymmetric Digital Subscriber Line (ADSL) or some other method, over the same line. The POTS frequency spectrum ranges from 300 to 3400 Hz. The ADSL frequency spectrum ranges from 24 kHz to 1100 kHz.

As shown in FIG. 1, the data and POTS signals are transmitted over standard telephone lines between a central office and a subscriber's home. The subscriber may have several modems and a POTS service. The subscriber is typically connected to a central office by twisted copper wire pair. At the central office, a signal coupler is used to filter, split and digitize signals coming into the central office from a subscriber. The digital signals are processed through switching networks and then sent through another signal coupler to another subscriber. Alternatively, the digital signal may be transmitted to another central office before being sent through another signal coupler to another subscriber. The signal coupler converts the digital signals from the switching circuits into analog signals for transmission to the subscriber as well as converting the analog input from the subscriber into digital signals which are sent to the switching circuits.

The transmission lines between the central office and the subscriber may be twisted copper pairs, as shown in FIG. 1. Other possibilities for transmission lines include fiber optics. In any case, the equipment at the central office and at the subscriber must be protected against power cross, lightning strikes, or other high voltage events and current surges on the telephone line. The main voltage protection is accomplished outside of the central office. However, secondary voltage protection is usually included in the signal coupler. In FIG. 2, the signal from the subscriber appears on the TIP and RING lines and the secondary voltage protection is shown as the circuit protection 101.

After the voltage and current protection is accomplished, the signal is split into data and voice lines. The data is sent at frequencies in the 20–30 kilohertz range and up while POTS voice information is nominally below 3000 Hz. The splitting, then, is normally done by using a high-pass filter for the data lines and a series of low-pass filters for the POTS lines. The series of filters is further required to remove the noise from the incoming telephone cable. FIG. 2 shows the typical filtering circuit for the POTS. In FIG. 2, the voice filtering is accomplished by a multistage filtering circuit. The typical low pass filter used in the multistage filtering circuit has two to four stages of filtering.

The POTS signal from the subscriber, after passing through the protection circuit 101, is filtered by the multi-stage low pass filter 102. The multiple stages allow for filtering of multiple orders (i.e., one stage provides two orders of filter, thus multiple stages provides multiples of second order filtering). The components of each stage include an inductor pair and a capacitor. Stage 1 in FIG. 2, for example, has inductor L1 connected in series with the TIP line after protection circuit 101 and inductor L1' connected in series with the RING line after the protection circuit. Capacitor C1 is connected across the TIP and RING lines after the inductor pair L1 and L1'. The remaining stages have similar components. In addition, the low pass filter 102 includes resistors R1 and R2 connected in series with the TIP and RING lines before they are connected to Stage 1 and resistors R3 and R4 connected in series with the IP and RING lines after they exist stage N. In addition, the low pass filtering circuit may include an additional inductor pair acting as a common mode choke which rejects signals common to both input lines. The common mode choke is connected before stage 1 and is connected similar to inductor pair L1 and L1'.

Each component of the filtering circuit (i.e., the resistors, inductors, and capacitors) must be capable of withstanding the high battery voltage (48 V) and high DC currents (typically 25 mA) used in the subscriber loop. This necessitates that each of the components in the filtering circuit be discrete components which require a large amount of space on the circuit board. This space requirement restricts the number of lines that can be placed on a given circuit board. It is desirable, then, to reduce the amount of filtering which must be accomplished in the high voltage mode.

SUMMARY OF THE INVENTION

Accordingly, the present invention provides a signal coupler circuit which provides the circuit protection and the filtering in a way that allows conservation of space on the circuit board at the central office. This is done by filtering the voice lines, at least in part, in a portion of the circuit where the high battery voltage is no longer present.

An analog signal capable of containing both POTS and data signals is present between the TIP and RING lines. The TIP and RING lines are the components of a standard twisted pair configuration of telephone service. The invention, however, is not restricted to twisted pairs and is useful for any transmission method of telephone service.

The signal between TIP and RING is first inputted to a voltage surge protection circuit. The surge protection circuit limits voltage spikes and current surges which could damage other components. The main voltage and current surge protection is connected to the transmission line outside of the central office so that the protection required on the circuit board inside the central office is secondary circuit protection.

The output signal from the protection circuit is inputted to a low-pass filter. The low-pass filter occupies a minimal amount of space while being capable of accommodating the high voltage telephone lines. In the preferred embodiment, only one stage of filtering is used. More stages of filtering could be used at this point but, because of the high battery voltage, these stages utilize a great deal of circuit board space.

The output signal from the low-pass filter is then sent to a standard subscriber loop interface circuit (SLIC) device. The SLIC is a standard chip which splits the two incoming lines into four lines, a pair of receive lines and a pair of transmit lines.

The transmit lines are finally filtered after the SLIC chip to remove the remainder of the noise. When the filtering is done after the signal is passed through the SLIC component, the high battery voltage is no longer present. The filtering components, then, can exist on a single chip and will take up much less space on the circuit board. Alternatively, some of the filtering may be accomplished digitally after the signal has been digitized by the CODEC.

The present invention provides a way of dispensing with the multistage high-voltage filtering which typically occurs before the SLIC in favor of low voltage, and therefore smaller and more compact, filtering on the transmit lines after the SLIC. The resulting savings in space will allow more signal couplers to exist on a given circuit board.

DESCRIPTION OF THE INVENTION

In accordance with the present invention, most of the POTS filtering is removed from areas of the circuit which require components capable of handling the high battery voltage and DC current of the telephone subscriber loop to areas of the circuit where only low voltage filtering is required.

Figure 3:
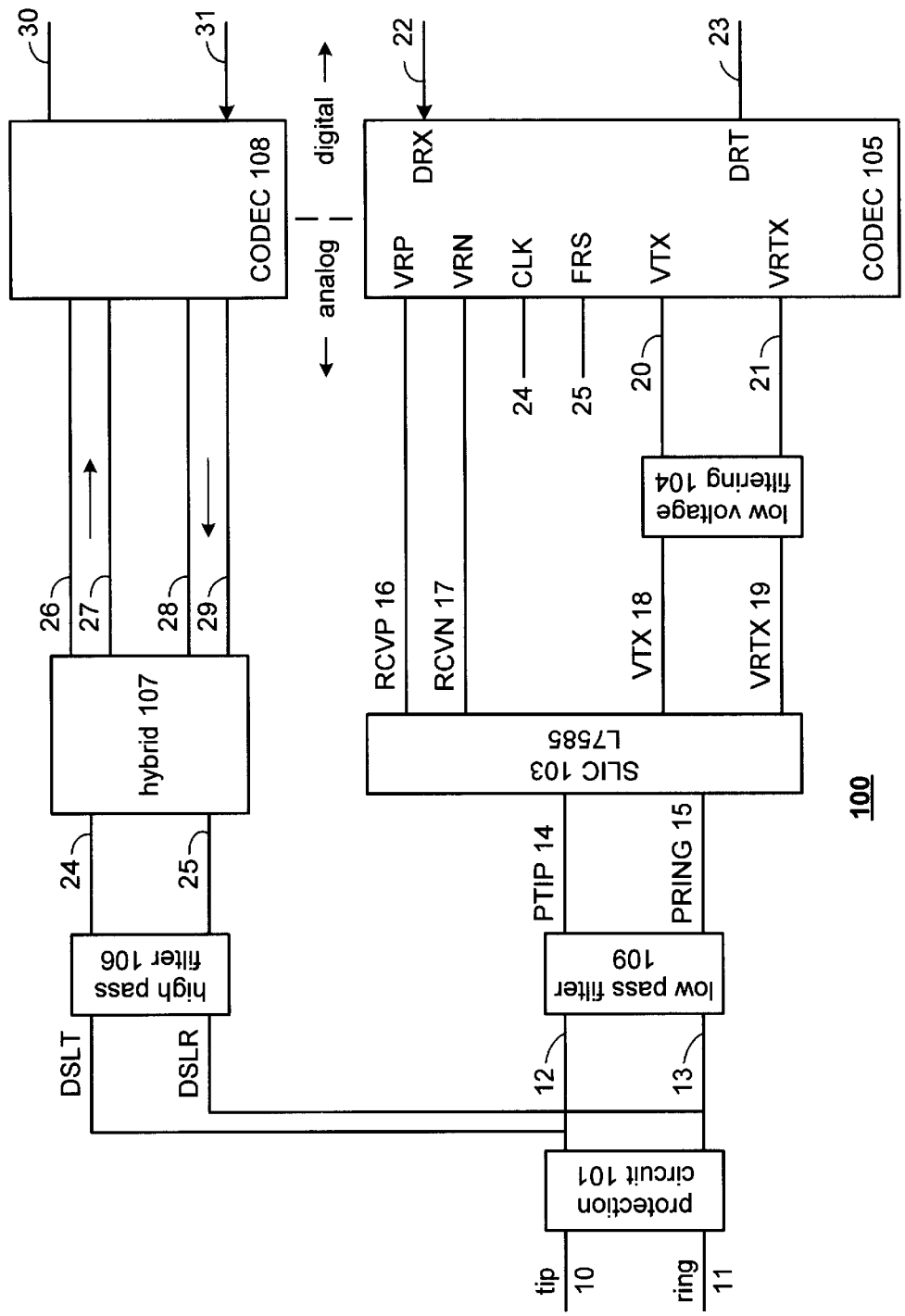
FIG. 3 is a block diagram of a device to accomplish the present invention for POTS filtering.

FIG. 3 shows a block diagram of the signal coupler 100 which will accomplish this result. The TIP line 10 and RING line 11 represent the two wires of the twisted copper pair. TIP line 10 and RING line 11 are inputted to the protection circuit 101. The protection circuit 101, a standard well-known circuit, provides the voltage and current protection necessary to guard the remainder of the device from high voltage and high current surges typically caused by lighting strikes, power cross, or other unexpected electrical events. The Bellcore administrative standard LATA Switching System Generic Requirements (LSSGR), the standard adopted by all Bell operating companies, has a first level lightening strike test and a second level lightening strike test. (See Lucent Technologies, *Overvoltage Protection of Solid-State Subscriber Loop Circuits*, APPLICATION NOTE, FEB. 1997, at 9–10). In the first level test, the circuit must survive the tests outlined in Table 1. The circuit need not survive the second level test, but no electrical shock or fire hazards can be created.

TABLE 1

Bellcore First Level Lightning Strike Test

| $V_p$ (V) | Pulse ($\mu s$) (Rise Time/Decay Time) | $I_{peak}$ (A) | Reps |
|---|---|---|---|
| ± 600 | 10/1000 | 100 | 50 |
| ± 1000 | 10/360 | 100 | 50 |
| ± 100 | 10/1000 | 100 | 50 |
| ± 2500 | 2/10 | 500 | 50 |

In a typical subscriber loop, the battery voltage across TIP 10 and RING 11 is 48 V and the loop may typically carry a current of from 23–35 mA. Although the current is nominally 25 mA, it could range as high as 120 mA.

The output signal from the protection circuit 101 on lines 12 and 13 is sent to low pass filter 109. It's a good practice to use different numbers for components that are different (particularly when one is prior art and one is part of the invention). In addition, the lines DSLT 12 and DSLR 13 are inputted to high pass filter 106. Low pass filter 109 passes the POTS signal while not passing the data signal. High pass filter 106 does not pass the POTS signal while passing the data signal. In this way, the data path is separated from the POTS path.

In addition to splitting the POTS signal and the data signal, low pass filter 109 also provides enough filtering to prevent overloading of the subscriber loop interface circuit (SLIC) 103. This requires that the low pass filter 109 have at least one stage. In the preferred embodiment, low pass filter 109 has only one stage of filtering. The output of low pass filter 109 is PTIP 14 and PRING 15. Signals PTIP 14 and PRING 15 are inputted to SLIC 103.

The subscriber loop interface circuit (SLIC) 103 is a standard integrated circuit which includes the function of splitting two lines which carry both transmit and receive signals (i.e., bi-directional transmission) into four lines, two of which carry the transmit signal and two of which carry the receive signal. The SLIC 103 must also handle the 48 volt battery voltage supplied by the central office and 25 mA of current or more, as opposed to the typically 5 V commonly handled by such circuits. SLIC chips are standard chips and may be purchased, for example, from Lucent Technologies, AMD, Harris, or Mitel. The Lucent Technologies chip L7585 is the preferred component used with this invention. With the use of the standard SLIC chip, the filtering circuit shown in FIG. 3 will appear identical to a standard prior art filtering circuit for compatibility with existing equipment.

The SLIC 103 outputs the transmitted signals on lines 18 and 19. The received signals are on lines 16 and 17. The received signals are those signals received from the central office for transmission through the signal coupler 100, to the subscriber. Lines TIP 10 and RING 11 will carry both the transmit and the received signals, the transmit signals being those that are received into the coupling circuit 100 and the receive signals being those that are received out of the coupling circuit 100.

Figure 1:
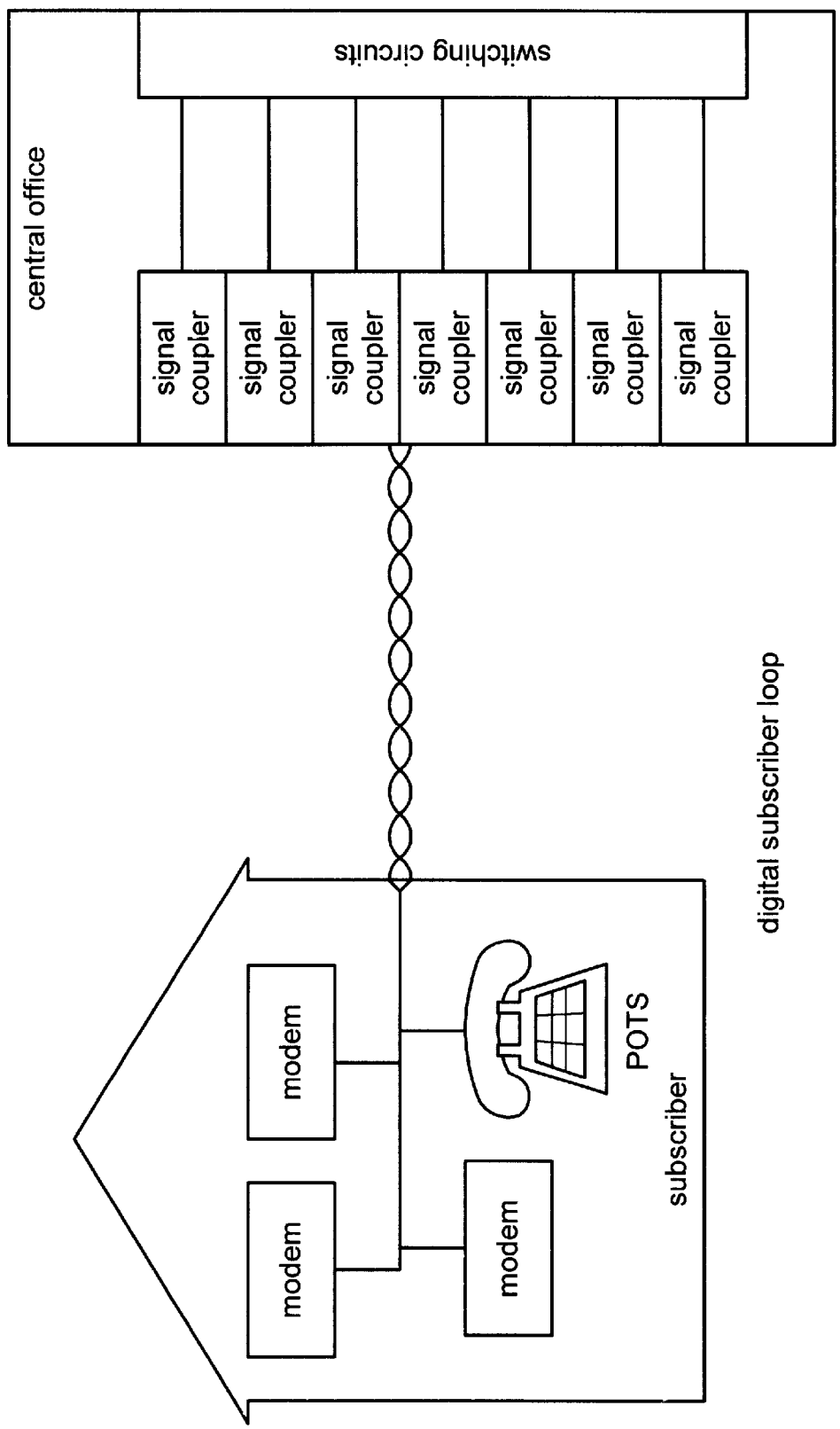
FIG. 1 illustrates a block diagram of a telephone subscriber loop.

The transmit signals, on lines VTX 18 and VRTX 19, are inputted to a low voltage filter 104. Filter 104 finishes filtering the incoming transmit signals. The receive signals, RCVP 16 and RCVN 17, are not filtered in this circuit. These signals would be filtered in another circuit as transmit signals before being switched into the circuit illustrated here as receive signals. The other coupling circuits and the switching circuits are shown in FIG. 1.

The four lines—RCVP 16, RCVN 17, VTX 20 and VRTX 21—are connected to coder/decoder circuit (CODEC) 105. CODEC 105 receives the digital signal DRX 22 and outputs the analog receive signal between lines 16 and 17. CODEC 105 receives the filtered analog transmit signal between lines 20 and 21 and outputs the corresponding digital signal on DRT 23. CODEC 105 may also receive a clock signal 24 and a framing signal 25 in order to coordinate with a digital processing and switching circuit at the central office.

The high pass filter 106, in addition to filtering out the POTS signal, also filters the 48 V battery voltage from between lines DSLT 12 and DSLR 13. The output lines of high pass filter 106, lines 24 and 25, are connected to Hybrid 107. Hybrid 107 performs the same two-wire to four-wire function that SLIC 103 performs without the necessity of being capable of handling the high battery voltage or the associated high DC current. The Hybrid may need to operate with high current in higher frequency ranges. The four-wire side of Hybrid 107 includes receive signals on receive lines 26 and 27 and transmit signals on lines 28 and 29. The four-wires 26, 27, 28 and 29 are connected to CODEC 108. Codec 108 converts the analog transmit signals on lines 28 and 29 to digital signals output on line 31 and the digital receive signals received on line 30 to analog signals on lines 26 and 27. The digital lines 30 and 31 are connected to the digital processing and switching circuits at the central office (See FIG. 1).

Figure 4:
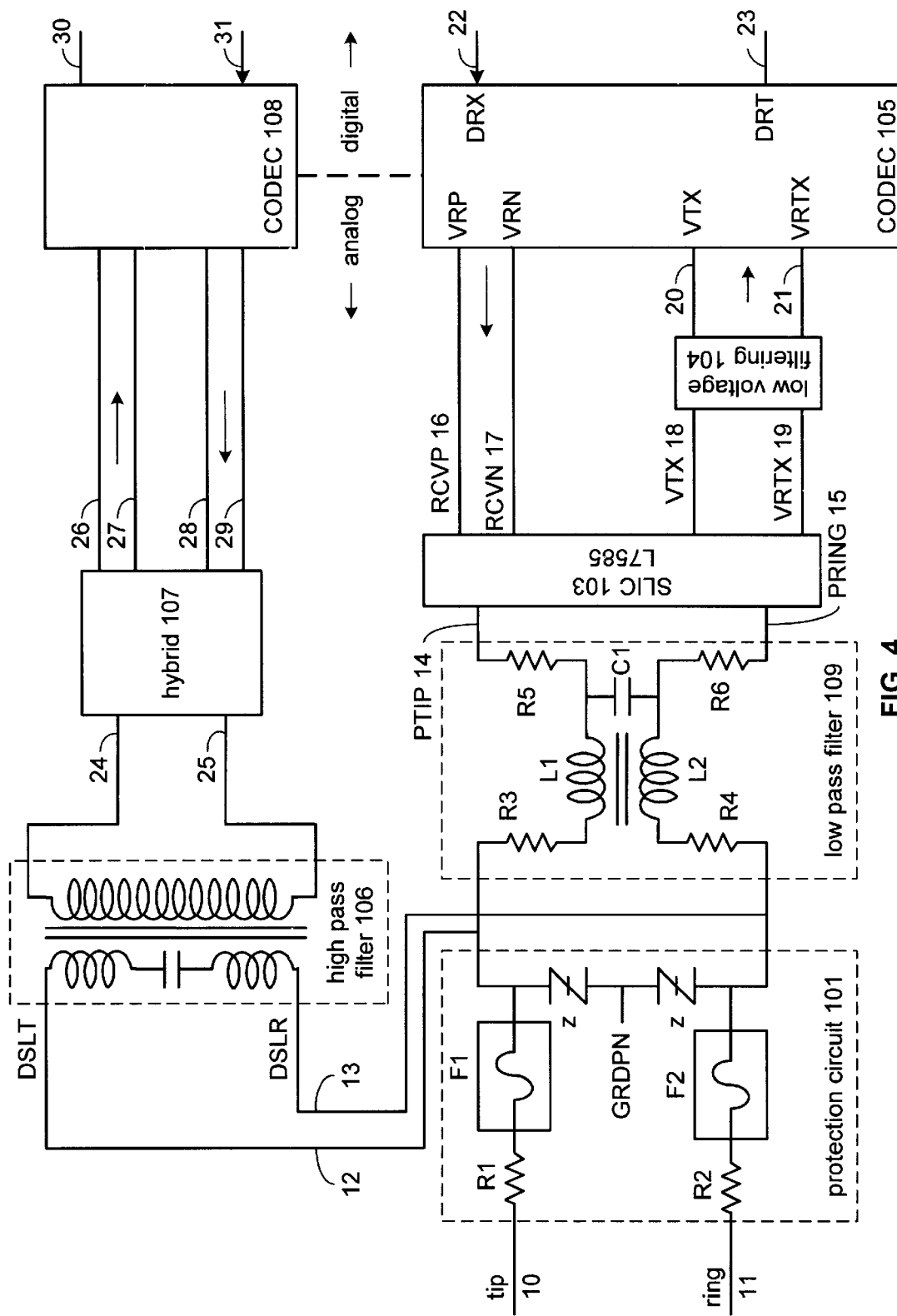
FIG. 4 is a circuit diagram of the preferred embodiment of the present invention of POTS filtering.

FIG. 4 illustrates signal coupler 100 showing in greater detail the circuitry within the circuit protection circuit 101, the low pass filter 109 and the high pass filter 106.

The circuit protection 101 in FIG. 4 has two components, current protection and voltage protection. The current protection on TIP line 10 is accomplished by resistor R1 in series with fuse F1. On RING line 11, the current protection is accomplished by resistor R2 in series with fuse F2. The combinations of resistor and fuse adhere to the Bellcore specifications, fuses F1 and F2 opening only in second level testing. In the embodiment shown in FIG. 4, R1 and R2 are both 5.6 Ω resistors.

The voltage protection is provided by component Z, which acts as a triggered voltage shunt. Monolithic protection devices consisting of one or more SCR-type thyristers are commonly available under the trade names such as SURGECTAR (Harris, Inc.), SIDACTOR (Teccor, Inc.) and LB1201 SLIC Protector (Lucent Technologies, Inc.). Although any device which prevents the voltage between lines TIP 10 and RING 11 from exceeding the Bellcore standard could be used, devices such as the SIDACTOR have the advantage of being benign until they are triggered. Preferably, Z is a SIDACTOR. Component Z is connected across lines TIP 10 and RING 11 with an output leg attached to a protection ground GNDPN. After Z triggers, it shunts the voltage across it directly to GNDPN. Preferably, Z should be chosen so that it triggers at around 200 volts.

The low pass filter 109 in FIG. 4 is a single-stage LRC circuit. Line 12 is connected in series with resistor R3, inductor L1, and resistor R5. Line 13 is connected in series with resistor R4, inductor L2 and resistor R6. Capacitor C1 is connected across the two lines, from a point between inductor L1 and resistor R5 to a point between inductor L2 and resister R6. Inductors L1 and L2 comprise a four terminal inductor with an iron core. In FIG. 4, R3 and R4 are 15 Ω resistors, R5 and R6 are 20 Ω resistors, L1 and L2 are 18 mH inductors and C1 is a 0.022 μF capacitor.

Although the low pass filter illustrated in FIG. 4 is the preferred embodiment, other embodiments will be apparent to one skilled in the art. For example, providing an initial coupled inductor as a common mode choke, adding further stages of filtering or using different combinations of resistors, capacitor and inductor in the filtering are options. The components of the low pass filter, however, operate with the 48 volt battery voltage provided at the central office and the inductors have to pass tens of milliamperes of current without saturation. As such, the components require a large amount of circuit board space.

The high pass filter 106 in FIG. 4 includes capacitor C2 and transformer T1. Transformer T1 has a first side and a second side. The first side is split and a first coil P1 and a second coil P2 of the first side are coupled through capacitor C2. An input lead of the first coil P1 is connected to line DSLT 12 and the opposite input lead of the first coil P1 is connected to a lead of capacitor C2. The opposite lead of capacitor C2 is connected to an input lead of the second coil P2. The opposite input lead of coil P2 is connected to line DSLR 13. The two leads of the second coil of transformer T1 are connected to Hybrid 107.

The high pass filter 106 illustrated in FIG. 4 is of a standard type, any circuit which separates the high frequency data input from the DC and POTS signals can be used. After this separation is accomplished, the Hybrid 107 need only operate at low voltage.

Figure 2:
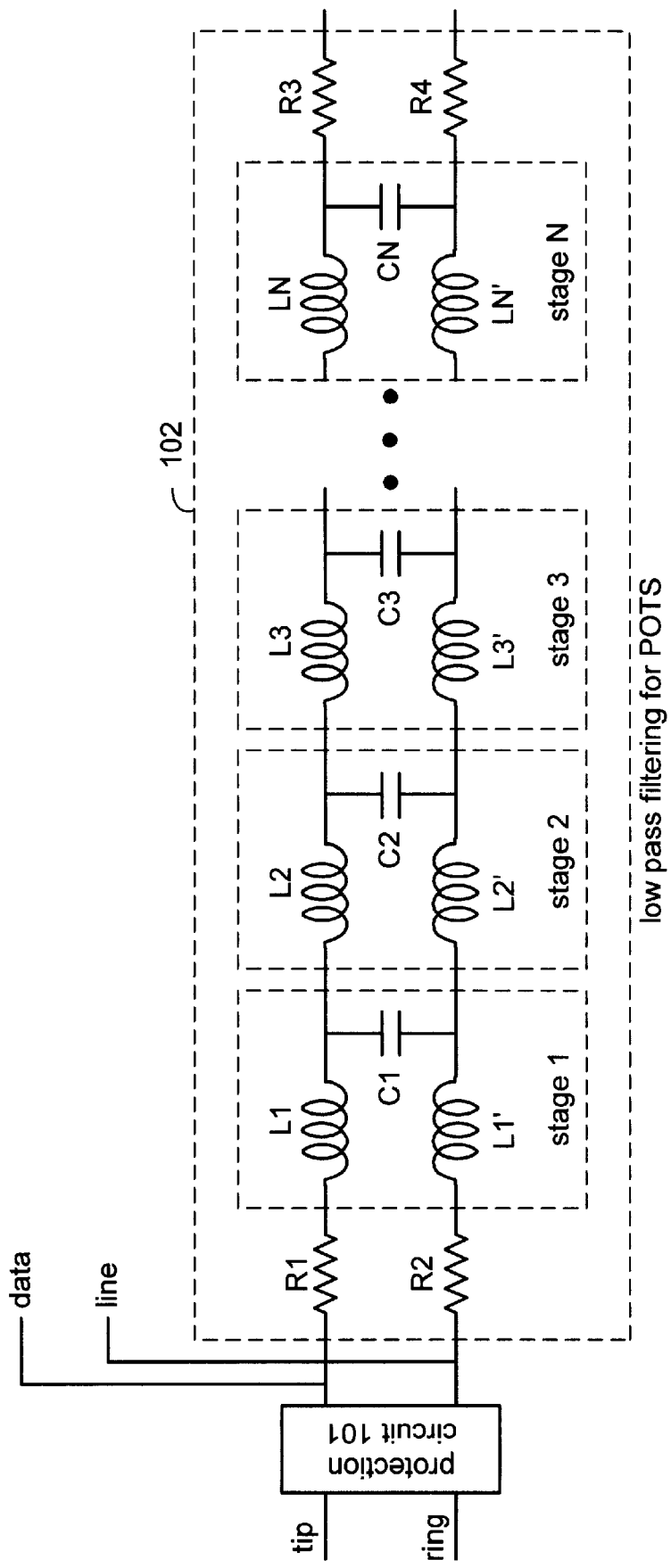
FIG. 2 illustrates a circuit diagram of a prior art POTS filtering arrangement.

The low voltage filter 104 can be any continuous time filter which provides the desired filtering. Several of these filters are well known in the art. Among the well known integrated circuit continuous time filters are $G_m$-C filters and MOSFET-C filters. Each of these filter types can be implemented with multiple stages providing for filters of several orders. A standard ladder filter (which employs inductors and capacitors for a multistage filtering circuit similar to the high voltage filter shown in FIG. 2) will accomplish the low voltage filtering, however it is difficult to accurately construct an inductor on an IC chip and implementation with individual components will take a great deal of space on the circuit board and defeat the purpose of the invention.

Figure 5:
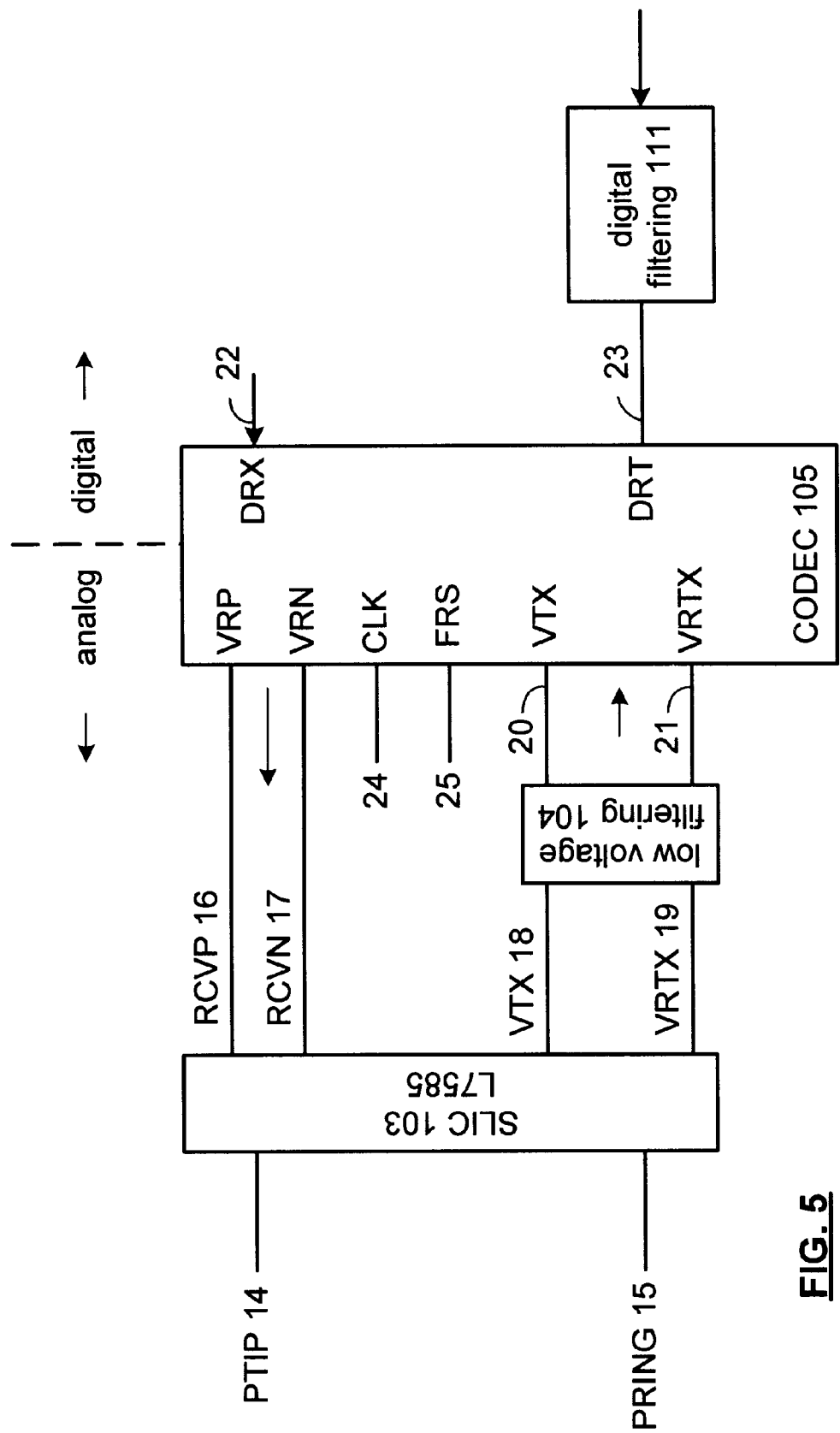
FIG. 5 shows a second embodiment where part of the low voltage filtering is accomplished on the digital side of the circuit.

A second embodiment of the invention is shown in FIG. 5. The embodiment shown in FIG. 5 differs from the preferred embodiment shown in FIG. 4 in that part of the filtering is shifted to the digital side of CODEC 105. In this embodiment, the filtering is split between a Low Voltage Filter 110 and a Digital Filtering Circuit 111 located on line 23.

The examples illustrated here are representative examples and in no way limit the scope of this application. Other obvious embodiments of the invention will be apparent to one skilled in the art and are included within the scope of this application. One obvious embodiment is to not have a data path so that only POTS signals are processed.

We claim:

1. A signal splitter, comprising:

a circuit protection having a line side and a circuit side, the line side being coupled to a TIP line and a Ring line;

a signal splitting low pass filter for splitting POTS signal transmission from digital data signal transmission, the signal splitting low pass filter having a single stage with two or more orders of filtering and having a first pair of leads and a second pair of leads, the first pair of leads being coupled to the circuit side of the circuit protection;

a subscriber loop interface circuit having a third pair of leads, a transmit pair of leads and a receive pair of leads, the third pair of leads being connected to the second pair of leads of the signal splitting low pass filter;

a low voltage filter having an input pair of leads and an output pair of leads, the input pair of leads being connected to the transmit pair of leads of the subscriber loop interface circuit, the low voltage filter having two or more orders of low pass filtering; and a coding/decoding circuit having a digital transmit lead, a digital receive lead, a pair of analog transmit leads, and a pair of analog receive leads, the pair of analog transmit leads being connected to the output of the low voltage filter and the pair of analog receive leads being connected to the receive pair of leads of the subscriber loop interface circuit.

2. The signal splitter as in claim 1 and further comprising:

a high pass filter having a fourth pair of leads and a fifth pair of leads, the fourth pair of leads being coupled to the circuit side of the circuit protection;

a hybrid having a sixth pair of leads, a transmit pair of leads, and a receive pair of leads, the sixth pair of leads being connected to the fifth pair of leads of the high pass filter; and a data coding/decoding circuit having an analog transmit pair of leads, an analog receive pair of leads, a digital transmit lead, and a digital receive lead, the analog transmit pair of leads being connected to the transmit pair of leads of the Hybrid and the analog receive pair of leads being connected to the receive pair of leads of the hybrid.

3. The signal splitter as in claim 1, wherein the line side of the circuit protection has a first line lead and a second line lead, the circuit side of the circuit protection has a first circuit lead and a second circuit lead, and the circuit protection comprises:

a first resistor having a first lead and a second lead, the first lead of the first resistor being the first line lead;

a first fuse having a first lead and a second lead, the first lead of the first fuse being coupled to the second lead of the first resistor, the second lead of the first fuse providing the first circuit lead;

a second resistor having a first lead and a second lead, the first lead of the second resistor being the second line lead;

a second fuse having a first lead and a second lead, the first lead of the second fuse being coupled to the second lead of the second resistor, the second lead of the second fuse providing the second circuit lead; and a triggered voltage shunt having a first lead and a second lead, the first lead of the triggered voltage shunt being connected between the first circuit lead and the second lead of the triggered voltage shunt being connected to the second circuit lead.

4. The signal splitter as in claim 3, wherein the triggered voltage shunt is a monolithic protection device comprising at least one thyristor, the monolithic protection device also having an output lead, and the output lead being connected to a ground protect, the monolithic protection device operating to shunt a voltage between the first lead of the triggered voltage shunt and the second lead of the triggered voltage shunt through the output lead of the triggered voltage shunt to the ground protect if the voltage reaches a trigger level.

5. The signal splitter as in claim 4, wherein the trigger level is inclusively between 200 and 250 volts.

6. The signal splitter as in claim 1, wherein the first pair of leads of the signal splitting low pass filter includes a first tip lead and a first ring lead, the second pair of leads of the signal splitting low pass filter includes a second tip lead and a second ring lead, the signal splitting low pass filter including:

a first resistor having a first lead and a second lead, the first lead of the first resistor being the first tip lead of the circuit protection;

a first inductor having a first lead and a second lead, the first lead of the first inductor being coupled to the second lead of the first resistor;

a second resistor having a first lead and a second lead, the first lead of the second resistor being coupled to the second lead of the first inductor, the second lead of the second resistor being a the second tip lead;

a third resistor having a first lead and a second lead, the first lead of the third resistor being the first ring lead of the circuit protection;

a second inductor having a first lead and a second lead, the first lead of the second inductor being coupled to the second lead of the third resistor;

a fourth resistor having a first lead and a second lead, the first lead of the fourth resistor being coupled to the second lead of the second inductor, the second lead of the fourth resistor being the second ring lead of the low pass filter; and a capacitor having a first lead and a second lead, the first lead of the capacitor being connected to the second lead of the first inductor, the second lead of the capacitor being connected to the second lead of the second inductor.

7. The signal splitter as in claim 6, wherein the signal splitting low pass filter further includes a common mode choke connected to the first pair of leads of the signal splitting low pass filter.

8. The signal splitter as in claim 2, wherein the high pass filter comprises:

a transformer having a first coil, a second coil, and a third coil, the first coil having a first lead and a second lead, the second coil having a first lead and a second lead, and the third coil having a first lead and a second lead, the first lead of the first coil and the second lead of the second coil providing the fourth pair of leads of the high pass filter, the first lead of the third coil and the second lead of the third coil providing the fifth pair of the leads of the high pass filter; and a capacitor having a first lead and a second lead, the first lead of the capacitor being connected to the second lead of the first coil of the transformer, the second lead of the capacitor being connected to the first lead of the second coil of the transformer.

9. The signal splitter as in claims 1, wherein the low voltage filter includes a Gm-C filter.

10. The signal splitter as in claim 1, wherein the low voltage filter includes a MOSFET-C filter.

11. The signal splitter as in claim 1 and further comprising a digital filter coupled to the digital side of the coding/decoding circuit.

* * * * *